US012342030B2

(12) United States Patent
Wang et al.

(10) Patent No.: US 12,342,030 B2
(45) Date of Patent: Jun. 24, 2025

(54) VIRTUAL REMOTE CONTROL AMONG DIGITAL ASSISTANT DEVICES

(71) Applicant: Google LLC, Mountain View, CA (US)

(72) Inventors: Bo Wang, San Jose, CA (US); Manuel Angel Ureno, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/009,415

(22) PCT Filed: Jul. 2, 2021

(86) PCT No.: PCT/US2021/040336
§ 371 (c)(1),
(2) Date: Dec. 9, 2022

(87) PCT Pub. No.: WO2023/277928
PCT Pub. Date: Jan. 5, 2023

(65) Prior Publication Data
US 2024/0244284 A1    Jul. 18, 2024

(51) Int. Cl.
*H04N 21/422* (2011.01)
*H04L 67/303* (2022.01)
(Continued)

(52) U.S. Cl.
CPC ....... *H04N 21/4222* (2013.01); *H04L 67/303* (2013.01); *H04N 21/41265* (2020.08); *H04N 21/42203* (2013.01); *H04N 21/4316* (2013.01)

(58) Field of Classification Search
CPC ......... H04N 21/4222; H04N 21/41265; H04N 21/42203; H04N 21/4316; H04L 67/303
(Continued)

(56) References Cited

U.S. PATENT DOCUMENTS 9,219,790 B1 * 12/2015 Filev ................ H04L 67/535
10,383,098 B2    8/2019 Iwami
(Continued)

FOREIGN PATENT DOCUMENTS

CN    106126014    11/2016
CN    110320811    10/2019

OTHER PUBLICATIONS

Etio et al., "Measruing Holistic User Experience Keeping an Eye on What Matters Most to Users", Proceedings of the 12$^{th}$ IEEE/ACM International Conference on Utility and Cloud Computing, New York, NY, Oct. 1, 2019, pp. 1-4, XP058553449.
(Continued)

*Primary Examiner* — John W Miller
*Assistant Examiner* — Omer Khalid
(74) *Attorney, Agent, or Firm* — DORITY & MANNING P.A.

(57) ABSTRACT

Virtual remote control among digital assistant devices is provided. A first computing device detects a second computing device and determines a capability of the second computing device. The first computing device generates a prompt indicating that the first computing device is capable to control the second computing device. The first computing device receives, responsive to the prompt, an instruction to control the second computing device. The first computing device establishes a communication channel with the second computing device. The first computing device invokes a virtual controller on the first computing device. The virtual controller forwards queries received by the first computing device to the second computing device via the communication channel to control the second computing device.

19 Claims, 4 Drawing Sheets

(51) Int. Cl.
*H04N 21/41* (2011.01)
*H04N 21/431* (2011.01)

(58) Field of Classification Search
USPC .......................................................... 348/734
See application file for complete search history.

(56) References Cited

U.S. PATENT DOCUMENTS

| | | | |
|---|---|---|---|
| 11,438,643 B2 | 9/2022 | Yang | |
| 2011/0254683 A1 | 10/2011 | Soldan et al. | |
| 2013/0024197 A1* | 1/2013 | Jang ................... | H04N 21/4828 704/E15.001 |
| 2013/0035942 A1 | 2/2013 | Kim et al. | |
| 2013/0275547 A1* | 10/2013 | Chew ................. | G06Q 30/0277 709/217 |
| 2014/0024197 A1 | 1/2014 | Kawashima et al. | |
| 2018/0176272 A1* | 6/2018 | Zur ...................... | H10K 85/655 |
| 2018/0343240 A1* | 11/2018 | Marchand ............. | H04W 8/005 |
| 2020/0204631 A1 | 6/2020 | Subramaniam et al. | |
| 2020/0236152 A1 | 7/2020 | Bradley et al. | |
| 2024/0232947 A1 | 7/2024 | Spitz et al. | |

OTHER PUBLICATIONS

International Search Report for Application No. PCT/US2021/040336, mailed on Mar. 25, 2022, 5 pages.
Johnson, "How Chromecast Works : How Stuff Works", Jan. 29, 2014, https://electronics.howstuffworks.com/chromecast.htm/printable, retrieved on Apr. 18, 2019, p. 4, paragraph 2, XP055582473.
Lee et al., "Actual Remote Control: A Universal Remote Control Using Hand Motions on a Virtual Menu", IEEE Transactions on Consumer Electronics, IEEE Service Center, New York, NY, vol. 55, No. 3, Aug. 1, 2009, pp. 1439-1446, XP011277811.
Ivankovic et al., "Additional Multimedial Screen for Control of Hbbtv Application with the use of Android Operating System", 2018 IEEE $26^{th}$ Telecommunications Forum, Nov. 20, 2018, pp. 420-425, XP033499137.
Richard, et al., "Service Advertisement and Discovery: Enabling Universal Device Cooperation", IEEE Internet Computing, Institute of Electrical and Electronic Engineers, Oct. 31, 2000, pp. 18-26, XP002215827.
International Preliminary Report on Patentability for Application No. PCT/US2021/040336, mailed Jan. 11, 2024, 9 pages.
Chinese Search Report Corresponding to Application No. 2021800470306 on Oct. 31, 2024.
Baldauf et al., "The Screen is Yours—Comparing Handheld Pairing Techniques for Public Displays", Ambient Intelligence: $4_{th}$ International Joint Conference, AML, 2013, 16 pages.
Fahmi et al., "3D-to-2D Projection Algorithm for Remote Control using Smartphone Enhancing Smartphone Capability for Costless Wireless Audio Visual Consumer Appliance Control", $27^{th}$ International Conference on Advanced Information Networking and Applications Workshops, 2013, 6 pages.

* cited by examiner

VIRTUAL REMOTE CONTROL AMONG DIGITAL ASSISTANT DEVICES

PRIORITY CLAIM

This application is based upon and claims the right of priority under 35 U.S.C. § 371 to International Application No. PCT/US2021/040336 filed on Jul. 2, 2021, which is incorporated by reference herein in its entirety.

BACKGROUND

A computing device, such as a television, can receive instructions from a remote control that is dedicated to the computing device. However, the computing device or remote control may have limited functions or a limited interface.

SUMMARY

This disclosure is generally directed to virtual remote control among digital assistant devices. A physical location can contain or include multiple computing devices. The computing devices can run different programs to form a fragmented, silo-like environment in which it is challenging or not possible for one computing device to communicate with another. For example, each of the computing devices can have different types of hardware and operating systems that are customized or configured for the particular computing device. Further, it can be challenging to keep track of or determine which computing device has which capability, resulting in a poor user experience or inability to efficiently perform certain functions due to the lack of capability of the device. For example, a smart television or monitor configured with a digital assistant can be controlled by a physical remote. However, if the remote is unavailable, lost or not functioning, it can be challenging to control the smart television or monitor. Further, the smart television or monitor may have a limited interface or configured with a poor user interface.

Systems and methods of this technical solution provide virtual remote control among digital assistant devices. In an illustrative example, a wearable computing device, such as a smart watch, can be brought within proximity of a smart television computing device that is broadcasting a presence signal. The wearable computing device can detect the presence signal of the smart television, and then determine a capability of the smart television. The smart watch can display an icon indicating the capability to control the smart television from the smart watch. The smart watch, responsive to input from a user, can perform a handshaking process to establish a communication channel with the smart television and invoke a virtual controller on the smart watch. The smart watch can then receive voice queries or other input from the user of the smart watch, which can be forwarded to the smart television for processing. The smart television can receive the queries from the smart watch and process the queries as if the queries were received directly by the smart television, thereby providing seamless, virtual control of the smart television via the smart watch. While the smart watch is paired with the smart television, the smart watch can display a persistent on the smart watch to indicate the active communication channel and virtual controller.

At least one aspect is directed to a system for dynamic remote control of devices. The system can include a first computing device having one or more processors and memory. The first computing device can detect a second computing device located within a range of the first computing device. The first computing device can determine, responsive to detecting the second computing device, a capability of the second computing device. The first computing device can generate, based on the capability of the second computing device, a prompt indicating that the first computing device is capable to control the second computing device. The first computing device can receive, responsive to the prompt, an instruction to control the second computing device. The first computing device can establish, responsive to the instruction, a communication channel with the second computing device. The first computing device can invoke a virtual controller on the first computing device. The virtual controller can forward queries received by the first computing device to the second computing device via the communication channel to control the second computing device.

At least one aspect is directed to a method of dynamic remote control of devices. The method can be performed by a first computing device having one or more processors and memory. The method can include the first computing device detecting a second computing device located within a range of the first computing device. The method can include the first computing device determining, responsive to detecting the second computing device, a capability of the second computing device. The method can include the first computing device generating, based on the capability of the second computing device, a prompt indicating that the first computing device is capable to control the second computing device. The method can include the first computing device receiving, responsive to the prompt, an instruction to control the second computing device. The method can include the first computing device establishing, responsive to the instruction, a communication channel with the second computing device. The method can include the first computing device invoking a virtual controller on the first computing device. The virtual controller can forward queries received by the first computing device to the second computing device via the communication channel to control the second computing device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
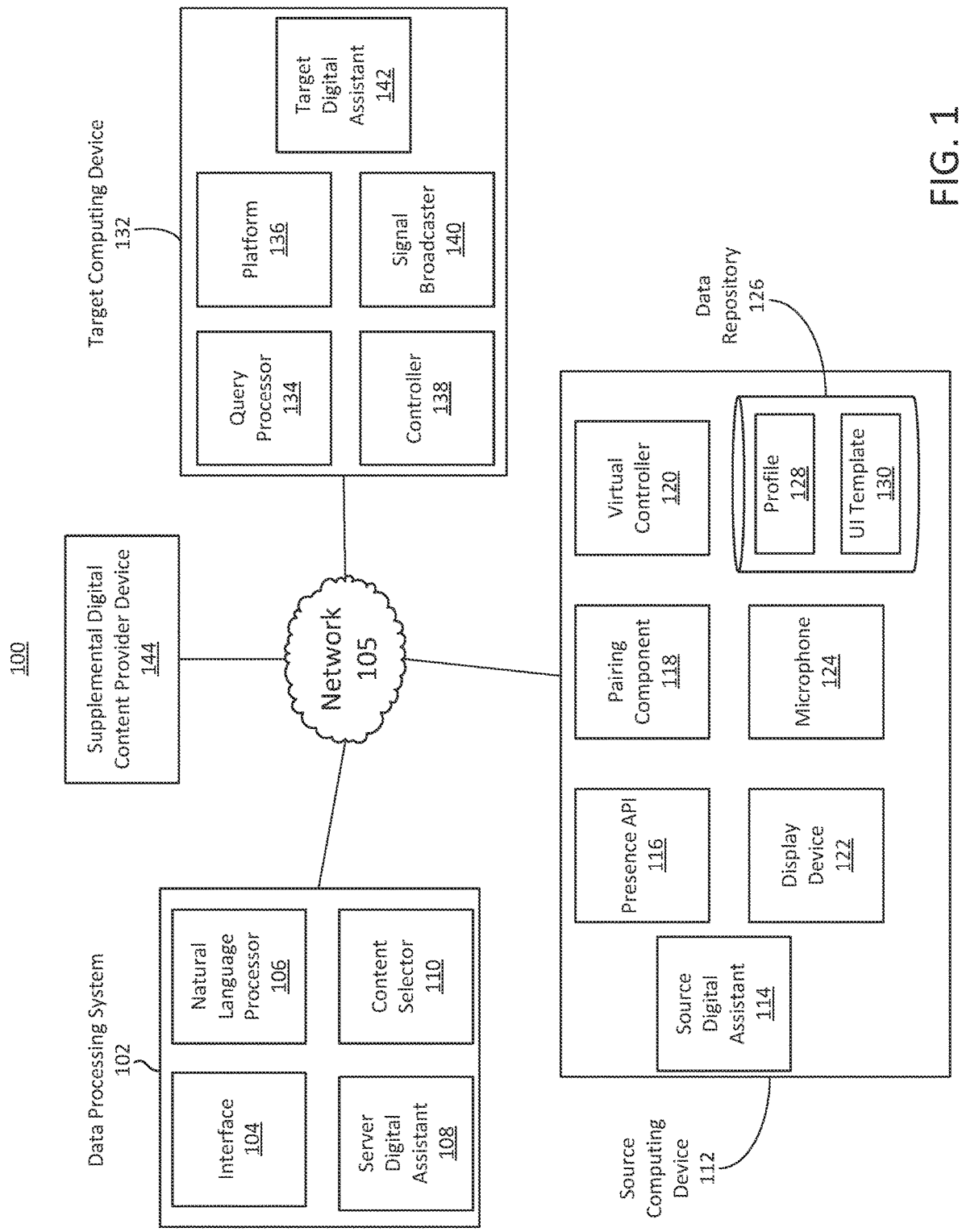
FIG. 1 is an illustration of an example system for virtual remote control among digital assistant devices, in accordance with implementations.

Following below are more detailed descriptions of various concepts related to, and implementations of, methods, apparatuses, and systems of virtual remote control among digital assistant devices. The various concepts introduced above and discussed in greater detail below may be implemented in any of numerous ways.

This technical solution is generally directed to virtual remote control among digital assistant devices. For example, digital assistants are available in over a billion computing devices in the world. However, these computing devices contain a variety of hardware and software, resulting large fragmentation among the devices and the inability to effectively communicate between devices to perform functions the devices are capable of performing. Thus, this technical solution can provide a virtual controller that is designed, constructed and operational to seamlessly control other devices (e.g., television, smart display, auto, or internet of things ("IOT") devices) with a personal device of the user (e.g., mobile device, phone, watch, speaker, or headset) in a manner that provides the same user interface and user experience as if the user had interacted directly with the target device physically with a physical remote control, touch, or other default interface of the target device.

It can be challenging to provide cross device control to perform a variety of action sequences or critical user journeys. There may be a predefined limited set of critical user journeys that are configured for cross device control. A target device can be configured to perform a set of actions, whereas only a small subset of those actions can be performed on the target device by a source device different from the target device. For example, the target device may be capable of fulfilling the following queries: show me action movies; show me weather today; show me my photos; play Movie_Name; pause/resume; turn on my TV. However, the target device may only be able to fulfill a subset of the queries when the query is first received by a different device (e.g., a source device) and then the source device attempts to the control the target device. For example, the source device may not be able to execute the following functions on the target device: show me action movies on my TV; show me weather today on my TV; and show me my photos on my TV. Further, this cross-device control may require additional or excessive input to function properly. For example, the user may be required to input the name of the target device along with each query. This can not only require the user to provide additional input, but also require the source computing device or other computing device to perform additional natural language processing or other processing to parse the query and identify the name of the target device. Further, since the cross device and the target device are built as silos, they can have duplicate and redundant stacks that perform the same or similar functionality, thereby complicating the stack unnecessarily and accumulating technology debt without providing, or detracting from, a good user experience.

Thus, systems and methods of this technical solution can provide a virtual controller that can provide for seamless cross-device control. The virtual controller of this technical solution can provide the same user experience on the target device regardless of which device is the source device on which the virtual controller is invoked. The virtual controller can be effortless to use by providing a proactive user interface to guide users to access other target devices without requiring the user to learn a new user interface. The virtual controller of this technical solution can utilize a single, unified, horizontal stack that allows for the same experience across multiple digital surfaces and target devices.

FIG. 1 illustrates an example system 100 for virtual remote control among digital assistant devices, in accordance with implementations. The system 100 can include content selection infrastructure. The system 100 can include a data processing system 102. The data processing system 102 can communicate with one or more of a source computing device 112, a target computing device 132, or a supplemental digital content provider device 144 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be provided, output, rendered, or displayed on at least one source computing device 112 or target computing device 132. The source computing device 112 can include, for example, a laptop, desktop, tablet, digital assistant device, smart phone, mobile telecommunication device, portable computers, smart watch, headset, or speaker. The target computing device 132 can include, for example, a television, smart display, automotive unit, or network connected device (e.g., an internet of things ("IoT") device). For example, via the network 105 a user of the source computing device 112 or target computing device 132 can access information or data provided by a supplemental digital content provider device 144. In some cases, the source computing device 112 or target computing device 132 may or may not include a display; for example, the computing device may include limited types of user interfaces, such as a microphone and speaker. In some cases, the primary user interface of the computing device 112 or 132 may be a microphone and speaker, or voice interface. In some cases, the computing device 112 includes a display device 122 coupled to the source computing device 112, and the primary user interface of the computing device 112 can leverage the display device 122. The target computing device 132 can include one or more output interfaces, such as a display device or speaker.

The source computing device 112 can refer to a computing device that is being used by a user or in the possession of a user. The source computing device 112 can be a wearable device or mobile device. The source computing device 112 can be located with a user as the user travels or moves from one location to another. The source computing device 112 can be a stationary device or a device that remains in a same location for a certain time period. The target computing device 132 can refer to a computing device or client device that is located at a private setting, such as a residence, residential dwelling, home, apartment, condominium. The target computing device 132 can be located at a public setting, such as a hotel, office, restaurant, retail store, mall, or park.

The source computing device 112 can be referred to as a cross device. The source computing device 112 can refer to the device that users interface with in order to control the target computing device 132. The target computing device 132 can refer to the device that is being controlled by the source computing device 112.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be provided, output, rendered, or displayed by the source client computing device 112 or target computing device 132. For example, via the network 105 a user of the source computing device 112 or target computing device 132 can access information or data provided by the supplemental digital content provider device 144.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the source computing device 112, the target computing device 132, or the supplemental digital content provider device 144 (or third-party content provider device, content provider device). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device, such as a supplemental digital content provider device 144 or a service provider device. The supplemental digital content provider device 144 or other service provider device can include at least one logic device such as a computing device having a processor to communicate via the network 105, for example with the source computing device 112, the data processing system 102, or the target computing device 132.

The supplemental digital content provider device 144 can provide audio based digital components for display by the source computing device 112 or target computing device 132 as an audio output digital component. The digital component can be referred to as a sponsored digital component because it is provided by a third-party sponsor. The digital component can include an offer for a good or service, such as a voice based message that states: "Would you like me to order you a taxi?" For example, the supplemental digital content provider device 144 can include memory to store a series of audio digital components that can be provided in response to a voice based query. The supplemental digital content provider device 144 can also provide audio based digital components (or other digital components) to the data processing system 102 where they can be stored in a data repository of the data processing system 102. The data processing system 102 can select the audio digital components and provide (or instruct the supplemental digital content provider device 144 to provide) the audio digital components to the source computing device 112. The audio based digital components can be exclusively audio or can be combined with text, image, or video data.

The data processing system 102 can include a content placement system having at least one computation resource or server. The data processing system 102 can include, interface, or otherwise communicate with at least one interface 104. The data processing system 102 can include, interface, or otherwise communicate with at least one natural language processor 106 (or natural language processor component). The interface 104 or natural language processor 106 can form or be referred to as a server digital assistant component. The data processing system 102 can include, interface, or otherwise communicate with at least one server digital assistant 108 (or server digital assistant component). The server digital assistant 108 can communicate or interface with one or more voice-based interfaces or various digital assistant devices or surfaces in order to provide data or receive data or perform other functionality. The data processing system 102 can include at least one content selector 110 (or content selector component).

The data processing system 102, interface 104, NLP 106, or content selector 110 can each include at least one processing unit or other logic device such as programmable logic array engine, or module configured to communicate with a data repository or database of the data processing system 102. The interface 104, NLP 106, or content selector 110 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of source computing devices 112 (or computing device or digital assistant device) or target computing devices 132. A user of a source computing device 112 or mobile computing device can affirmatively authorize the data processing system 102 to obtain network activity information corresponding to the source computing device 112 or mobile computing device. For example, the data processing system 102 can prompt the user of the source computing device 112 for consent to obtain one or more types of network activity information. The source computing device 112 can include a mobile computing device, such as a smartphone, tablet, smartwatch, or wearable device. The identity of the user of the source computing device 112 can remain anonymous and the source computing device 112 can be associated with a unique identifier (e.g., a unique identifier for the user or the computing device provided by the data processing system or a user of the computing device). The data processing system 102 can associate each observation with a corresponding unique identifier.

The data processing system 102 can include an interface 104 (or interface component) designed, configured, constructed, or operational to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can communicate with one or more of the source computing device 112, supplemental digital content provider device 144, or target computing device 132 via network 105.

The data processing system 102 can interface with an application, script or program installed at the source computing device 112 or target computing device 132, such as an app to communicate input audio signals to the interface 104 of the data processing system 102 and to drive components of the source client computing device 112 or target computing device 132 to render output visual or audio signals. The data processing system 102 can receive data packets or other signal that includes or identifies an audio input signal.

The data processing system 102 can include a natural language processor ("NLP") 106. For example, the data processing system 102 can execute or run the NLP 106 to parse received input audio signals or queries. For example, the NLP 106 can provide for interactions between a human and a computer. The NLP 106 can be configured with techniques for understanding natural language and allowing the data processing system 102 to derive meaning from human or natural language input. The NLP 106 can include or be configured with technique based on machine learning, such as statistical machine learning. The NLP 106 can utilize decision trees, statistical models, or probabilistic models to parse the input audio signal. The NLP 106 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP 106 can convert the audio input signal into recognized text by comparing the input signal against a stored, representative set of audio waveforms and choosing the closest matches. The set of audio waveforms can be stored in a data repository or other database accessible to the data processing system 102. The representative waveforms are generated across a large set of users, and then may be augmented with speech samples from the user. After the audio signal is converted into recognized text, the NLP 106 matches the text to words that are associated, for example via training across users or through manual specification, with actions that the data processing system 102 can serve. Aspects or functionality of the NLP 106 can be performed by the data processing system 102, the source computing device 112, or the target computing device 132. For example, an NLP component can execute on the source computing device 112 or the target computing device 132 to perform aspects of converting the input audio signal to text and transmitting the text via data packets to the data processing system 102 for further natural language processing.

The audio input signal can be detected by the sensor or transducer (e.g., a microphone) of the source client computing device 112. Via the transducer, the audio driver, or other components the source computing device 112 can provide the audio input signal to the data processing system 102 (e.g., via the network 105) where it can be received (e.g., by the interface 104) and provided to the NLP 106 or stored in a data repository.

The data processing system 102 can receive, via the interface 104, data packets comprising an input audio signal detected by a microphone of the source computing device 112 or a microphone of the target computing device 132. The data processing system 102 can receive data packets that are generated based on an input audio signal detected by the microphone. The data packets can be filtered or unfiltered. The data packets can be a digitized version of the detected input audio signal. The data packets can include text that is generated by the source computing device 112 or target computing device 132 based on the detected input audio signal. For example, a source digital assistant 114 of the source computing device 112, or a target digital assistant 142 of the target computing device 132, can process a detected input audio signal and transmit data packets based on the processed input audio signal to the server digital assistant 108 for further processing or to perform an action.

The data processing system 102 can include a server digital assistant 108. The server digital assistant 108 and the NLP 106 can be a single component, or the server digital assistant 108 can include one or more component or functionality of the NLP 106. The server digital assistant 108 can interface with the NLP 106. The data processing system 102 (e.g., server digital assistant 108) can process the data packets to perform an action or otherwise respond to the voice input. In some cases, the data processing system 102 can identify an acoustic signature from the input audio signal. The data processing system 102 can identify, based on a lookup in a data repository (e.g., querying a database), an electronic account corresponding to the acoustic signature. The data processing system 102 can establish, responsive to identification of the electronic account, a session and an account for use in the session. The account can include a profile having one or more policies. The data processing system 102 can parse the input audio signal to identify a request and a trigger keyword corresponding to the request.

The NLP 106 can obtain the input audio signal. The NLP 106 of the data processing system 102 can receive the data packets with the voice input or input audio signal responsive to the digital assistant detecting a trigger keyword. The trigger keyword can be a wakeup signal or hotword that indicates to the source computing device 112 to convert the subsequent audio input into text and transmit the text to data processing system 102 for further processing.

Upon receiving the input audio signal, the NLP 106 can identify at least one request or at least one keyword corresponding to the request. The request can indicate intent or subject matter of the input audio signal. The keyword can indicate a type of action likely to be taken. For example, the NLP 106 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request. In another example, the voice input can include a search query such as "find jobs near me."

The NLP 106 can parse the input audio signal to identify, determine, retrieve, or otherwise obtain the request and one or more keywords associated with the request. For instance, the NLP 106 can apply a semantic processing technique to the input audio signal to identify the keyword or the request. The NLP 106 can apply the semantic processing technique to the input audio signal to identify a keyword or phrase that includes one or more keywords, such as a first keyword and a second keyword. For example, the input audio signal can include the sentence "I want to purchase an audiobook." The NLP 106 can apply a semantic processing technique, or other natural language processing technique, to the data packets comprising the sentence to identify keywords or phrases "want to purchase" and "audiobook". The NLP 106 can further identify multiple keywords, such as purchase, and audiobook. For example, the NLP 106 can determine that the phrase includes a first and second keyword.

The NLP 106 can filter the input audio signal to identify the trigger keyword. For example, the data packets carrying the input audio signal can include "It would be great if I could get someone that could help me go to the airport", in which case the NLP 106 can filter out one or more terms as follows: "it", "would", "be", "great", "if", "I", "could", "get", "someone", "that", "could", or "help". By filtering out these terms, the NLP 106 may more accurately and reliably identify the trigger keywords, such as "go to the airport" and determine that this is a request for a taxi or a ride sharing service.

In some cases, the NLP 106 can determine that the data packets carrying the input audio signal includes one or more requests. For example, the input audio signal can include the sentence "show me action movies". The NLP 106 can determine this is a request to play action movies. The server digital assistant 108 can transmit a request for content to the content selector 110 based on the input audio signal. The server digital assistant 108 can transmit a request for supplementary or sponsored content from a third-party content provider. The content selector 110 can perform a content selection process to select a supplementary content item or sponsored content item based on the action in the voice query. The content item can be a sponsored or supplementary digital component object. The content item can be provided by a third-party content provider, such as a supplemental digital content provider device 144. The supplementary content item can include an advertisement for goods or services. The content selector 110 can use the content selection criteria to select a content item responsive to receiving a request for content from the server digital assistant 108.

The server digital assistant 108 can receive a supplementary or sponsored content item from the content selector 110. The server digital assistant 108 can receive the content item responsive to the request. The server digital assistant 108 can receive the content item from the content selector 110, and present the content item, via audio output or visual output. The server digital assistant 108 can provide the content item for presentation via the target computing device 132 or the source computing device 112 that is communicatively coupled with the target computing device 132.

The data processing system 102 can include a content selector 110 designed, constructed, or operational to select supplementary content items (or sponsored content items or digital component objects). To select sponsored content item or digital components, the content selector 110 can use the generated content selection criteria to select a matching sponsored content item based on a broad match, exact match, or phrase match. For example, the content selector 110 can analyze, parse, or otherwise process subject matter of candidate sponsored content items to determine whether the subject matter of the candidate sponsored content items correspond to the subject matter of the keywords or phrases of the content selection criteria (e.g., an action or intent). The content selector 110 can identify, analyze, or recognize voice, audio, terms, characters, text, symbols, or images of the candidate digital components using an image processing technique, character recognition technique, natural language processing technique, or database lookup. The candidate sponsored content items can include metadata indicative of the subject matter of the candidate digital components, in which case the content selector 110 may process the metadata to determine whether the subject matter of the candidate digital component corresponds to the input audio signal. The content campaign provided by the supplemental digital content provider device 144 can include content selection criteria that the data processing system 102 can match to criteria indicated in the second profile layer or the first profile layer.

Supplementary digital content providers may provide additional indicators when setting up a content campaign that includes digital components. The supplemental digital content provider device 144 may provide information at the content campaign or content group level that the content selector 110 may identify by performing a lookup using information about the candidate digital component. For example, the candidate digital component may include a unique identifier, which may map to a content group, content campaign, or content provider.

Responsive to the request, content selector 110 can select a digital component object associated with the supplemental digital content provider device 144. The supplementary digital content can be provided by a supplementary digital content provider. The supplementary digital content can correspond to a type of service different from a type of service of the action data structure (e.g., taxi service versus food delivery service). The computing device 112 or 132 can interact with the supplementary digital content. The computing device 112 or 132 can receive an audio response to the digital component. The computing device 112 or 132 can receive an indication to select a hyperlink or other button associated with the digital component object that causes or allows the computing device 112 or 132 to identify the supplemental digital content provider device 144, request a service from the supplemental digital content provider device 144, instruct the supplemental digital content provider device 144 to perform a service, transmit information to the supplemental digital content provider device 144, or otherwise query the supplemental digital content provider device 144.

A supplemental digital content provider device 144 can establish an electronic content campaign. An electronic content campaign can refer to one or more content groups that correspond to a common theme. A content campaign can include a hierarchical data structure that includes content groups, digital component data objects, and content selection criteria provided by the content provider. Content selection criteria provided by the content provider device 144 an include a type of content, such as a digital assistant content type, search content type, streaming video content type, streamlining audio content type, or a contextual content type. To create a content campaign, supplemental digital content provider device 144 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or supplemental digital content provider device 144), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the source computing device 112 or target computing device 132. In some cases, an impression can refer to a viewable or audible impression; e.g., the digital component object is at least partially (e.g., 20%, 30%, 30%, 40%, 50%, 60%, 70%, or more) viewable on a display device of the computing device, or audible via a speaker of the source computing device 112 or the target computing device 132. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The supplemental digital content provider device 144 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the supplemental digital content provider device 144 can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The supplemental digital content provider device 144 can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The supplemental digital content provider device 144 can provide one or more keywords to be used by the data processing system 102 to select a digital component object provided by the supplemental digital content provider device 144. The supplemental digital content provider device 144 can identify one or more keywords to bid on, and further provide bid amounts for various keywords. The supplemental digital content provider device 144 can provide additional content selection criteria to be used by the data processing system 102 to select digital component objects. Multiple supplementary digital content provider devices 144 can bid on the same or different keywords, and the data processing system 102 can run a content selection process or ad auction responsive to receiving an indication of a keyword of an electronic message.

The supplemental digital content provider device 144 can provide one or more digital component objects for selection by the data processing system 102. The data processing system 102 (e.g., via content selector 110) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, digital component link, or an assistant application component. A digital component object (or digital component, supplementary content item, or sponsored content item) can include, for example, a content item, an online document, audio, images, video, multimedia content, sponsored content, or an assistant application. Upon selecting a digital component, the data processing system 102 can transmit the digital component object for rendering on a source computing device 112 or target computing device 132, or display device thereof. Rendering can include displaying the digital component on a display device, executing an application such as a chatbot or conversational bot, or playing the digital component via a speaker of the source computing device 112 or target computing device 132. The data processing system 102 can provide instructions to a target computing device 132 to render the digital component object. The data processing system 102 can instruct the target computing device 132 to generate audio signals or acoustic waves.

The content selector 110 can, responsive to a request, perform a real-time content selection process. Real-time content selection can refer to or include performing the content selection responsive to a request. Real-time can refer to or include selecting the content within 0.2 seconds, 0.3 seconds, 0.4 seconds, 0.5, 0.6 seconds, or 1 second of receiving the request. Real-time can refer to selecting the content responsive to receiving the input audio signal from the target computing device 132.

The content selector 110 can identify multiple candidate supplementary content items. The content selector 110 can determine a score or rank for each of the multiple candidate supplementary content items in order to select a highest ranking supplementary content item to provide to the computing device.

The system 100 can include, interface with, or otherwise communicate with a target computing device 132. The target computing device 132 can include a target digital assistant 142. The target digital assistant 142 can interface with the server digital assistant 108. The target digital assistant 142 can include one or more component or functionality of the server digital assistant 108. The target digital assistant 142 can, for example, receive input voice queries, and fulfill the queries or request by performing an action. For example, the target computing device 132 can be a television or smart display. The target digital assistant 142 can receive an input audio signal with queries or requests such as: "turn up the volume", "lower the volume", "change the channel", "play action movies", "pause", "resume", or "turn on the TV". The target digital assistant 142, upon receiving the input query, can interface with one or more of the controller 138 or query processor 134 to parse the query and perform a corresponding action. The target digital assistant 142 can include one or more component or functionality of the query processor 134.

The target computing device 132 can include a platform 136 designed, constructed and operational to provide one or more functionality of the target computing device 132. The platform 136 can refer to an operating system of the target computing device 132. The platform 136 can include a graphical user interface that is provided or presented by the target computing device 132. The platform 136 can be of any type, and interface with the hardware of the target computing device 132. The platform 136 can interface with the query processor 134 to provide requests. The platform 136 can include, invoke, or launch applications on the target computing device 132, such as a streaming multimedia applications, video games, music application, or weather application.

The target computing device 132 can include a controller 138 designed, configured and operational to control functionality or aspects of the target computing device 132. The controller 138 can provide for remote control of the target computing device 132. The controller 138 can receive signals or instructions from a hardware, physical remote control that is configured for use with the target computing device 132. The controller 138 can establish a communication channel with a virtual controller 120 of a source computing device 112, and receive queries from the virtual controller 120.

The controller 138 can include a gRPC service that receive inputs via a network 105, such as a local WIFI network. The controller 138 can receive queries or interactions and forward the queries or interactions to the query processor 134 for further processing or fulfillment. The query processor 134 can parse the query, determine an action to perform, and then perform the action. For example, the query processor 134 can interface with the platform 136 to control what is displayed on the target computing device 132. The query processor 134 can interface with the data processing system 102 to determine what action to take. The query processor 134 can interface with the target digital assistant 142 to perform an action.

The query processor 134 can include one or more component or functionality of the target digital assistant 142 or NLP 106 to parse and fulfill queries. The query processor 134 can receive queries from the controller 138, platform 136, or target digital assistant 142.

The target computing device 132 can include a signal broadcaster 140 designed, constructed and operational to broadcast wireless signals. The signal broadcaster 140 can broadcast wireless signals using one or more wireless protocols. The signal broadcaster 140 can broadcast the signals using a short-range wireless protocol, such as Bluetooth. The signal broadcaster 140 can broadcast the signal using a nearfield communication protocol. The signal broadcaster 140 can broadcast the signal using a WIFI protocol. The signal broadcaster 140 can broadcast the signal using Zig-Bee, or other wireless protocols.

The signal broadcaster 140 can broadcast or transmit the signals continuously or based on a time interval. For example, the signal broadcaster 140 can broadcast the signal every 0.1 seconds, 0.2 seconds, 0.3 seconds, 0.5 seconds, 1 second, 2 seconds, 3 seconds, 4 seconds or other time interval.

The signal broadcaster 140 can broadcast the signal responsive to a trigger condition or event. For example, the signal broadcaster 140 can broadcast the signal responsive to detecting motion or proximate to the target computing device 132. For example, the target computing device 132 can include or be coupled to a proximity sensor. The proximity sensor can detect the presence of nearby objects without any physical contact using an electromagnetic field or a beam of electromagnetic radiation (e.g., infrared) and identify changes in the field or return signal. Responsive to detecting a change in the field or return, the proximity sensor can provide an indication to the signal broadcaster 140 to broadcast a signal.

The signal broadcaster 140 can broadcast a signal with information. The information can identify the target computing device 132 and a capability of the target computing device 132. The information can identify a name (e.g., an identifier) or type of the target computing device 132. For example, the name of the target computing device 132 can be "living room TV", "bedroom TV", "den TV", "conference room A display", or other name or label established by an administrator, user or owner of the target computing device 132. The information can include or indicate the capability of the target computing device 132. The capability can refer to what types of functions the target computing device 132 is capable of performing. Capability can refer to what type of device the target computing device 132 is. For example, a capability can be smart display, smart television, automotive unit, network-connected device, or IoT device. The capability can indicate functions such as multimedia streaming, movie services, music services, an appliance functionality, or an automotive functionality, for example. The signal broadcaster 140 can broadcast additional information that can facilitate the source computing device 112 identifying the target computing device 132.

The system 100 can include, interface or communicate with a source computing device 112. The source computing device 112 can include or refer to a phone, watch, wearable device, speaker, headset or other type of device. The source computing device 112 can include a source digital assistant 114. The source digital assistant 114 can include one or more component or functionality of the server digital assistant 108 or target digital assistant 142, or NLP 106. The source digital assistant 114 can interface with or communicate with the server digital assistant 108 to fulfill or perform actions responsive to voice-based queries received or detected by the source computing device 112.

The source computing device 112 or target computing device 132 can include, interface with, or otherwise access one or more of a sensor, microphone, speaker, display device, transducer, or audio driver. For example, the source computing device 112 can include a display device 122 and a microphone 124. The display device 122 can include, for example, a light indicator, light emitting diode ("LED"), organic light emitting diode ("OLED"), or other visual indicator configured to provide a visual or optic output. In some cases, the target computing device 132 can include a display device, such as a television display. The sensor can include, for example, an ambient light sensor, proximity sensor, temperature sensor, accelerometer, gyroscope, motion detector, GPS sensor, location sensor, microphone, or touch sensor. The transducer can include a speaker or a microphone. The audio driver can provide a software interface to the hardware transducer. The audio driver can execute the audio file or other instructions to control the transducer to generate a corresponding acoustic wave or sound wave.

The sensor can receive or detect an input audio signal (e.g., voice input). A digital assistant (e.g., source digital assistant 114 or target digital assistant 142) can be coupled to the audio driver, the transducer, and the sensor. The digital assistant can filter the input audio signal to create a filtered input audio signal (e.g., by removing certain frequencies or suppressing noise). The digital assistant can convert the filtered input audio signal to data packets (e.g., using a software or hardware digital-to-analog converter). In some cases, the digital assistant can convert the unfiltered input audio signal to data packets and transmit the data packets to the data processing system 102. The digital assistant can transmit the data packets to a data processing system 102 comprising one or more processors and memory that execute a natural language processor component. One or more components of the source computing device 112 or target computing device 132 can each include at least one processing unit or other logic device such as programmable logic array engine, component or module. The system 100 and its components can include hardware elements, such as one or more processors, logic devices, or circuits.

The source computing device 112 or target computing device 132 can include, interface, or otherwise communicate with at least one application. Applications can be installed on the source computing device 112 or target computing device 132. The applications can be downloaded from an online application marketplace, such as an online marketplace provided by the data processing system 102. The application can include a native application installed on an operating system of the source computing device 112 or target computing device 132 by a manufacturer of the source computing device 112 or target computing device 132. The application can include any type of application that can provide a resource or service. For example, the application can be an exercise routine application, food ordering application, ride hailing application, weather application, document processing application, navigation application, messaging application, telephone application, streaming media application, social network application, calendar application, camera application, ticket purchasing application, electronic commerce application, banking application, financial services application, etc.

The source computing device 112 can include a data repository 126. The data repository 126 can include one or more local or distributed databases. The data repository 126 can include computer data storage or memory and can store one or more of a profile 128 or UI template 130. Profiles 128 can include a user profile, preferences, credentials, tokens, or other information that facilitates performing functions or fulfilling queries or responses. The UI template 130 can include visual or graphical user interface elements that can be used to generate prompts for display on the display device 122.

The source computing device 112 can include a source digital assistant 114. The source computing device 112 can include a digital assistant 114 designed, constructed and operational to receive a voice query or other audio input detected by a sensor of the source computing device 112, determine an intent or action based on the voice input, and facilitate fulfilling the corresponding action. The digital assistant 114 can include one or more component or functionality of NLP 106 or interface with NLP 106. For example, the source digital assistant 114 can interface with or communicate with the NLP 106 of the data processing system 102 to parse or process a voice input or audio input. In some cases, the source digital assistant 114 can be configured to process or parse the voice input without interfacing or communicating with the NLP 106 of the data processing system 102. For example, the source computing device 112 can perform digital assistant functionality without communicating via network 105 with the data processing system 102. The source computing device 112 can receive a voice query, parse the voice query, identify an action, and invoke an application on the source computing device 112 to fulfill the action without communicating via network 105 with the data processing system 102.

The source computing device 112 can include a presence application programming interface ("API") 116 designed, constructed and operational to detect a target computing device 132. The presence API 116 can detect or sense a signal broadcast by the signal broadcaster 140 of the target computing device 132. For example, the source computing device 112 can be referred to as a first computing device, and the target computing device 132 can be referred to as a second computing device.

The presence API 116 can be configured to listen for the signal broadcasted by the signal broadcaster 140 on a continuous basis, periodic basis, based on a time interval, or responsive to an event, condition or trigger. For example, the presence API 116 can wake up or open a communication port or search for a signal every 0.5 seconds, 1 seconds, 2 seconds or other time interval. In another example, the presence API 116 can listen for the broadcast signal responsive to a gesture or motion made by a user or wearer of the source computing device 112. For example, the source computing device 112 can be a watch, and the user can raise their wrist on which the watch is being word or waive their wrist in a manner that causes or triggers the presence API 116 to wake up or listen for a broadcast signal.

The presence API 116 can detect the signal broadcast by the signal broadcaster 140. Responsive to detecting the signal, the presence API 116 can determine that the source computing device 112 is within range of the target computing device 132. The presence API 116 can determine that the source computing device 112 is within a desired range, within a threshold range, or within another predetermined range of the target computing device 132. The presence API 116 can determine the range or distance between the source computing device 112 and the target computing device based on various techniques. For example, the presence API 116 can determine the distance or range from the target computing device 132 based on a strength of the signal broadcast by the signal broadcaster 140. The stronger the strength of the signal received or detected by the source computing device 112, the closer the source computing device 112 may be to the target computing device 132. If the signal strength detected at the source computing device 112 satisfies a strength threshold (e.g., an amplitude or power), then the presence API 116 can determine that the source computing device 112 is within range of the target computing device 132. In some cases, the source computing device 112 and target computing device 132 can exchange signals to compute a distance between the two devices, such as based on the amount of time taken for the signal to travel from one device to another (e.g., by comparing time stamps associated with transmission and receipt of the signals). In some cases, the presence API 116 can determine that the source computing device 112 is within range of the target computing device 132 based on the type of wireless protocol being used and whether the source computing device 112 was able to parse the signal. For example, if the wireless protocol used by the signal broadcaster 140 to transmit the signal is nearfield communication protocol, and the source computing device 112 was capable of processing or parsing the signal, then the source computing device 112 can determine that the target computing device 132 is within a satisfactory range.

The presence API 116 can be configured with or access one or more communication ports or sensors of the source computing device 112 to identify the signal broadcast by the signal broadcaster 140. The presence API 116 can parse, process or otherwise analyze the signal. The presence API 116 can parse or process the signal to identify the target computing device 132. For example, the presence API 116 can parse the signal to determine an identifier of the target computing device 132, such as a name of the target computing device 132. The signal can include one or more data packets with a header and payload. The payload can include information about the target computing device 132 that broadcasted the signal. The signal broadcaster 140 can be configured to embed or include information in the signals being broadcasted. The presence API 116 can analyze the signal to determine one or more of the name of the target computing device 132, type of target computing device 132, or capability of the target computing device 132.

The presence API 116 can determine to generate a prompt for display on the source computing device 112. The prompt can include one or more of a visual prompt, haptic prompt, or audio prompt. The prompt can include a display icon accompanied by one or more of an audio prompt (e.g., a beep or speech output) or haptic feedback. The presence API 116 can select the type of prompt based on the information in the signal broadcasted by the signal broadcaster 140. The presence API 116 can access a UI template 130 data structure to identify a design or template to use for the prompt, and then generate the prompt based on the template. The UI template 130 can include different icons for different types of devices or capabilities. For example, if the target computing device 132 has a target digital assistant 142, then the UI template 130 can include an icon for a microphone with a tag or metadata that indicates to use the microphone icon for target computing device 132 with digital assistant capabilities.

The signal broadcaster 140 can include, in the signal, information about the type of prompt to generate. For example, the signal can include data for a visual icon that corresponds to the type of the target computing device 132. In some cases, the presence API 116 can determine the type of prompt, or visual icon, to display based on the type of computing device or other information associated with the signal.

For example, the presence API 116 can determine a capability of the target computing device 132. The capability can include, for example, that the target computing device 132 is a television that can play streaming media content from one or more streaming services, can provide the weather, has access to the data processing system 102, is configured with a target digital assistant 142, controller 138, query processor 134, includes a speaker, or other capability information. The presence API 116 can determine whether to generate a prompt based on the information in the signal or otherwise obtained from the target computing device 132. For example, the signal broadcasted by the signal broadcaster 140 can indicate the capability of the target computing device 132 by including information in the signal that indicates that the target computing device 132 includes one or more of a controller 138, target digital assistant 142, or query processor 134. The presence API 116 can determine to generate a prompt responsive to determining that the target computing device 132 includes one or more of a controller 138, target digital assistant 142, or query processor 134. For example, responsive to determining that the target computing device 132 includes a controller 138 and query processor 134, the presence API 116 can determine to generate an icon with a prompt with a request asking the user whether to connect or pair with the target computing device 132.

The presence API 116 can generate, based on the capability of the target computing device 132, a prompt indicating that the source computing device 112 is capable to control the target computing device 132. If the target computing device 132 includes a controller 138 and query processor 134, then the presence API 116 can determine that the source computing device 112 can invoke a virtual controller 120 that can forward queries to the controller 138 that can be processed by the query processor 134 as if the queries were detected by the target digital assistant 142 and a microphone of the target computing device 132.

The source computing device 112 can receive, responsive to the prompt, an instruction to control the target computing device 132. The instruction can be received via an user interface of the source computing device 112. The instruction can be received via a user interacting with the prompt. The user can interact with the prompt via a touch interface of the source computing device 112. The user can interact with the prompt via voice input. The user can interact with the prompt via a gesture. For example, the prompt can be a button or other user interface element that the user can select or click on using a touch interface of the source computing device 112.

If the user does not interact with the prompt, or the source computing device 112 does not receive an instruction to control the target computing device 132, the source computing device 112 can determine to remove or hide the prompt. For example, the source computing device 112 can display the prompt for a duration, and if the user does not provide an instruction to control the target computing device 132 within the duration or time interval, the source computing device 112 can determine that the user is not interested in controlling the target computing device 132, and, accordingly, remove the icon. By removing the icon if the user does not want to control the target computing device 132, the source computing device 112 can reduce resource consumption, such as battery or processor consumption.

The source computing device 112 can include a pairing component 118 designed, constructed and operational to pair with the target computing device 132. The pairing component 118 can perform a handshaking process to pair with the target computing device 132. The pairing component 118 can pair with the target computing device 132 responsive to receiving an instruction to control the target computing device 132, which can be received responsive to the prompt generated by the presence API 116. The pairing component 118 can establish, responsive to the instruction, a communication channel with the target computing device 132.

The pairing component 118 can establish the communication channel using one or more techniques. The pairing component 118 can establish the communication channel with one or more component of the target computing device 132. The pairing component 118 can establish the communication channel with the controller 138 of the target computing device 132. For example, the controller 138 can provide a websocket protocol. The websocket protocol can refer to or include a communications protocol configured to provide full-duplex communication channels over a transmission control protocol ("TCP"). The websocket protocol can be located at layer 7 in the open systems interconnection ("OSI") model. The controller 138 can be configured to communicate with the source computing device 112 using the websocket protocol and a communication port, such as an HTTP port 443 and 80. The websocket protocol can facilitate real-time data transfer.

In some cases, the controller 138 can be configured to use a remote procedure call such as a gRPC remote procedure call. gRPC can refer to an open source remote procedure call that can communicate using HTTP/2 for transport and protocol buffers as the interface description language. gRPC can provide for authentication, bidirectional streaming and flow control, blocking or nonblocking bindings, cancellations, and timeouts. The controller 138, using the gRPC protocol, can generate cross-platform client and server bindings for different programming languages. Thus, the pairing component 118 can establish the communication channel as a two-way, full-duplex communication layer over a wireless protocol.

The pairing component 118 can perform a handshaking process with the controller 138 to establish the communication channel. During the handshaking process, the pairing component 118 can provide authentication credentials, such as a username, password, security token, digital certificate, or other authenticating information. The controller 138 can use the credentials to establish a connection with the data processing system 102 as a proxy. For example, the target digital assistant 142 can use the authenticating credentials to establish a connection with the server digital assistant 108 on behalf of the user of the source computing device 112, thereby converting the target digital assistant 142 to the source digital assistant 114 of the source computing device 112. By doing so, the target digital assistant 142 can response to and fulfill queries from the user of the source computing device 112. For example, a the target digital assistant 142, using the authenticating credentials, can response to a query such as "show me my photos" by accessing photos of the user stored in a cloud storage system in the data processing system 102, and presenting the photos via the target computing device 132.

The target computing device 132 can use the credentials to load a profile 128 of the user of the source computing device 112 in order to customize the target digital assistant 142 or configure the target digital assistant 142 to respond to queries from the user. Profile 128 information can include any profile information established by a user of the source computing device 112, including, for example, music information, media streaming information, photos, preferences, application preferences, settings, or contact information.

After the source computing device 112 has paired with the target computing device 132, or established the communication channel with the target computing device 132, the source computing device 112 can generate and present an icon on the display device 122 that indicates the active communication channel or communication session.

The source computing device 112 can maintain an icon on the display device 122 that indicates the active session. The icon can be persistent icon that remains visible on the display device 122 for as long as the communication session is active. The icon can be overlaid on other graphical user interface elements that may be presented on the display device 122. The source computing device 112 can maintain the icon on the display device 122 indicating the virtual controller 120 is active to forward queries via the communication channel.

Responsive establishing the communication channel or session, the source computing device 112 or pairing component 118 can invoke a virtual controller 120 on the source computing device 112 to forward queries received by the source computing device 112 to the target computing device 132 via the communication channel to control the target computing device 132. The source computing device 112 can include a virtual controller 120 designed, constructed and operational to forward queries to the controller 138 of the target computing device 132 via the communication session or channel established by the pairing component 118. The virtual controller 120 can receive or detect queries from the user of the source computing device 112. The queries can be voice input queries detected by the microphone 124.

In some cases, the source digital assistant 114 can detect a voice input and parse the voice input. The source digital assistant 114 can parse the voice input to identify a request or query. The source digital assistant 114 can query the virtual controller 120 to determine whether there is an active communication session with a target computing device 132. The source digital assistant 114 can determine a capability of the target computing device 132 (e.g., based on the signal previously broadcasted by the signal broadcaster 140). The source digital assistant 114 can determine that the target computing device 132 is capable of fulfilling the request or query. The source digital assistant 114 can forward the voice input query to the virtual controller 120 and instruct the virtual controller 120 to forward the query to the controller 138. The controller 138, upon receiving the query from the virtual controller 120, can forward the query to the query processor 134 of the target computing device 132. The query processor 134 can process the query as if the query was detected by a component of the target computing device 132. Thus, the target computing device 132 can seamlessly process the voice input detected by the source computing device 112 as if the target computing device 132 initially detected the query itself.

In some cases, the virtual controller 120 can automatically or by default forward all queries received by the source computing device 112 to the controller 138 while there is an active communication session between the virtual controller 120 and the controller 138. In some cases, the virtual controller 120 can provide a prompt responsive to detecting a query that asks the user whether to forward the query. In some cases, the virtual controller 120 can generate a prompt with a timer that allows the user to stop or block the forwarding of the query to the controller 138, but forward the query by default. Thus, the virtual controller 120 can provide for seamless forwarding of queries during an active communication session, and the query processor 134 can seamlessly process the queries as if the query was initially detected or received by the target computing device 132 itself. The target computing device 132 can receive the query forwarded from the source computing device 112, and process the query to control a function of the target computing device 132.

The source computing device 112 can detect, via the microphone 124, an audio input comprising a query. The source computing device 112 can forward the audio input to the target computing device 132 via the communication channel. The source computing device 112 can determine to automatically forward all queries while there is an active communication session with a target computing device 132. The target computing device 132 can receive the audio input, parse the audio input to identify the query, and process the query to control a function of the target computing device 132. For example, the query can be to play action movies, play a particular movies, show the user's photos, or provide the weather. The query processor 134 can receive the input audio, parse the input audio to identify the query, and fulfill the query based on the profile information 128 received or accessed by the target computing device 132 responsive to the authentication credentials received during the handshaking process. In some cases, to fulfill the query, the query processor 134 can communicate with the data processing system 102 using the profile information. The data processing system 102 can provide, for example, the photos to the target computing device 132 for presentation.

The data processing system 102 can select and provide content items from supplemental digital content providers 144. The data processing system 102 can generate a request for supplemental content items. For example, the data processing system 102 can receive a request for content from the target computing device 132. The request for content can be for photos, weather, travel information, ride sharing request, streaming multimedia, or other request. The data processing system 102 can receive the request from the query processor 134 or target digital assistant 142. The target computing device 132 can generate and provide the request for content responsive to receiving a query forwarded from the virtual controller 120 during an active communication session.

The data processing system 102 can generate a second or new request for supplemental content items. The data processing system 102 can generate the new request responsive to receiving the request from the target computing device 132. For example, in addition to providing the content that is requested by the target computing device 132 (e.g., the user's photos), the data processing system 102 can generate a new supplemental request for supplemental content, such as an advertisement digital object. The data processing system 102 can provide the new supplemental request to the content selector 110. The content selector 110 can perform a real-time content selection profile using information associated with the original request received from the target computing device 132 or profile information associated with the profile 128 of the source computing device 112. The content selector 110 can select, responsive to the second request for supplemental digital content, a supplemental content item responsive to the second request and based on profile information associated with the source computing device 112 responsive to the communication channel between the source computing device 112 and the target computing device 132 being active. The data processing system 102 can provide, for display on the target computing device 132, the supplemental content item different from the content of the request. Thus, the target computing device 132 can present the content responsive to the request forwarded by the virtual controller 120 (e.g., weather information), as well as supplemental content item (e.g., an advertisement). The supplemental content item can be related to the original request, or profile information or other information.

The communication session or channel between the source computing device 112 and target computing device 132 can be terminated or disconnected. Terminating or disconnecting the communication channel or session can refer to breaking the channel, ending the communication session, blocking further communication preventing further communication, or otherwise stopping the communication of data between the source computing device 112 and the target computing device 132. However, and in some cases, ending the communication session may not stop or prevent the signal broadcaster 140 from broadcasting signals that can be received or detected by the presence API 116. For example, ending the communication session can stop the forwarding of queries from the source computing device 112 to the target computing device 132.

One or more of the source computing device 112, target computing device 132, or data processing system 102 can terminate or end the communication channel. The communication channel can be ended responsive to a request to terminate the communication channel. The communication channel can terminate based on or responsive to an event, condition or trigger. For example, the communication channel can terminate based on a time interval or duration (e.g., 10 minutes, 15 minutes, 20 minutes, 30 minutes, or 1 hour). The communication channel can terminate when the source computing device 112 moves away from the target computing device 132 or is no longer within range of the target computing device 132. For example, the source computing device 112 can terminate the communication channel if the source computing device 112 can no longer detect the signals broadcast by the signal broadcaster 140 with a satisfactory signal strength (or amplitude or power). The communication channel can be terminated after a query has been fulfilled. For example, the target computing device 132 can send a signal to the source computing device 112 that the query has been completed, and the source computing device 112 can determine to disconnect from the target computing device 132. In some cases, the source computing device 112 can stay connected to the target computing device 132 or maintain a persistent communication channel until a user provides an instruction to terminate the communication channel, or the source computing device 112 moves out of range from the target computing device 132. In some cases, the target computing device 132 or source computing device 112 can determine to terminate the communication channel responsive to an idle timeout condition. For example, if the virtual controller 120 does not forward any queries to the controller 138 for a time interval (e.g., 10 minutes, 15 minutes, 20 minutes, 30 minutes, 1 hour or other time interval), the source computing device 112 or target computing device 132 can determine the communication channel has timed out. Terminating the communication channel if not in use can reduce security vulnerabilities and resource utilization (e.g., processor, memory, or battery utilization).

Upon terminating the communication channel, or the communication channel otherwise timing out, the target computing device 132 can remove any authentication credentials or profile information received from the source computing device 112. The target computing device 132 can erase, scrub, or delete any profile information or other information received from the source computing device 112 during the communication channel. The target computing device 132 can further erase, scrub or delete any information received from the data processing system 102 to fulfill queries received from the source computing device 112. For example, the target computing device 132 can delete photos that may have been received from the data processing system 102 responsive to a use query to show photos. Thus, the target computing device 132 can remove any user information received pursuant to establishing the communication channel or received subsequent to establishment of the communication channel.

Figure 2:
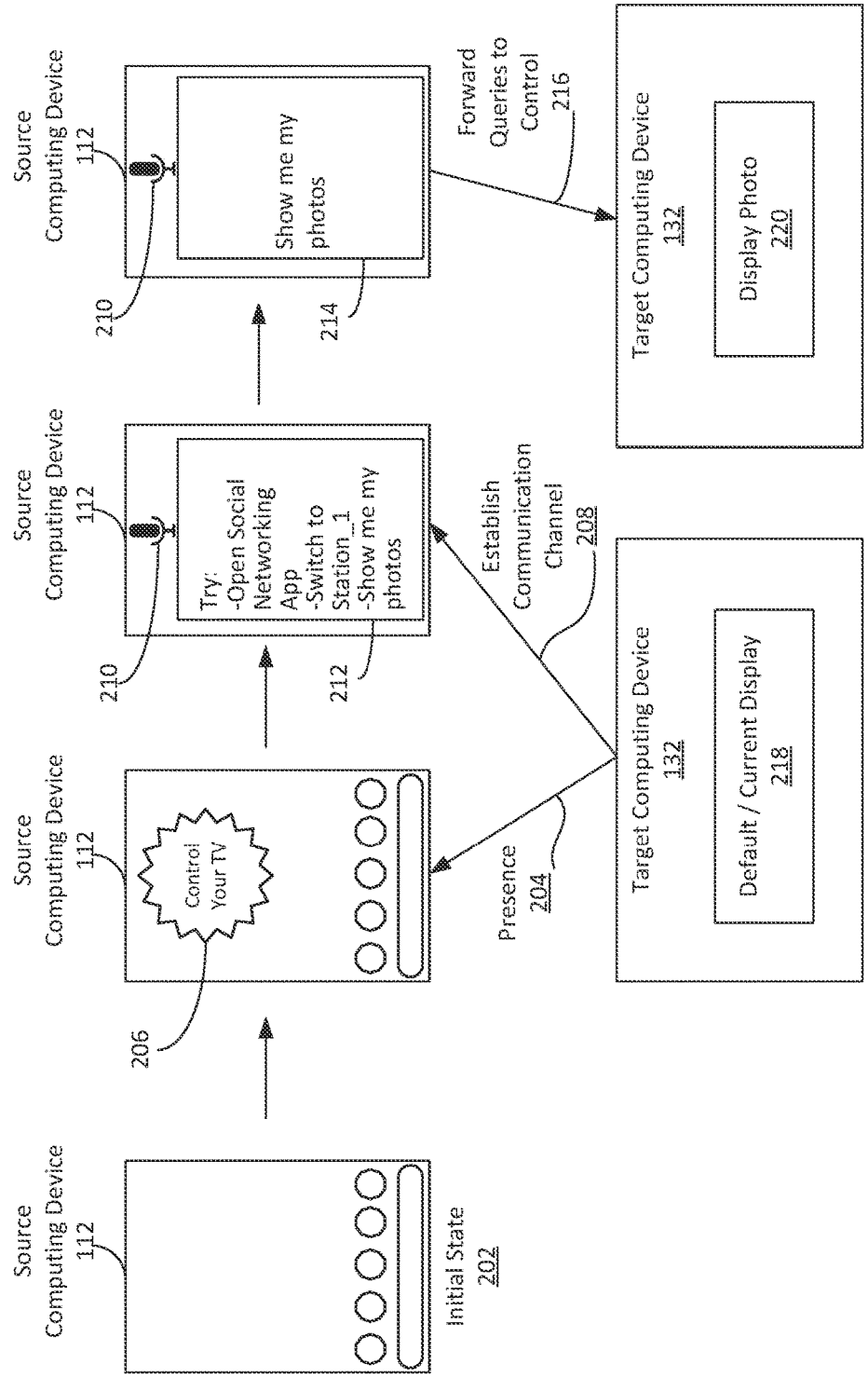
FIG. 2 is an illustration of an example operation of a system for virtual remote control among digital assistant devices, in accordance with implementations.

FIG. 2 is an illustration of an example operation of a system for dynamic remote control of devices, in accordance with implementations. The operation 200 can be performed by one or more system or component depicted in FIG. 1, including, for example, a source computing device 112, target computing device 132, or data processing system 102. The source computing device 112 can be a mobile device, such as a smart phone. The target computing device 132 can be a smart display or television.

The source computing device 112 can be in an initial state at 202. The initial state can refer to a state in which the source computing device 112 is not proximate to the target computing device 132, or not within range of the target computing device 132. During the initial state, there may be no communication channel between the source computing device 112 and the target computing device 132. During in the initial state 202, the source computing device 112 may not be receiving signals broadcasted by a signal broadcaster of the target computing device 132. For example, during the initial state 202, the source computing device 112 can be away from the target computing device 132, such as in a different room, floor, or building.

The source computing device 112 can be moved towards the target computing device 132. For example, a user of the source computing device 112 can carry the source computing device 112 close to the target computing device 132, or within range of a signal being broadcasted by the target computing device 132. At 204, the source computing device 112 can detect a signal broadcasted by the target computing device 132. The source computing device 112 can detect the signal via a presence API, for example. The source computing device 112, responsive to detecting the signal and corresponding information associated with the signal, can generate a prompt 206. The prompt can indicate that the source computing device 112 can be used to control the target computing device 132. The prompt can be, for example, "Control your TV", where the TV can refer to a television or the target computing device 132.

A user of the source computing device 112 can respond to the prompt 206 by selecting the prompt or otherwise providing input. The input can cause the source computing device 112 to establish the communication channel at 208. For example, the user can click on the prompt 206, and responsive to the selection, the source computing device 112 can perform a handshaking process with the target computing device 132 to establish the communication channel 208.

Upon establishing the communication channel, and in some cases, the source computing device 112 can generate and present a persistent icon 210 that indicates that the source computing device 112 has an active communication session with the target computing device 132. The icon can be a microphone if the target computing device 132 has the capability to receive voice input and process the voice input. In some cases, the source computing device 112 can provide suggestions 212 as to the types of functions the target computing device 132 can perform. Suggestions 212 can be generated based on the capabilities or functions of the target computing device 132. The source computing device 112 can generate the suggestions based on a UI template stored in memory of the source computing device 112. The source computing device 112 can receive the suggestions from the target computing device 132 or data processing system 102.

At 214, the source computing device 112 can receive a query from a microphone of the source computing device 112. The query can be "show me my photos". At 216, the source computing device 112 can determine to forward the query to the target computing device 132. For example, the source computing device 112 can include a virtual controller that can detect the input query and the active communication session, and then determine to forward the query to a controller of the target computing device 132.

The target computing device 132 can receive the query forwarded from the source computing device 112. The target computing device 132 can process the query as if the target computing device 132 received the voice query directly from the user, as opposed to from the virtual controller, due to the established communications channel. The target computing device 132 can change the default or current display 218 (e.g., a screen saver, television show or other media currently presented on the television) with a display of the photos 220 associated with an account or profile of the source computing device 112.

Figure 3:
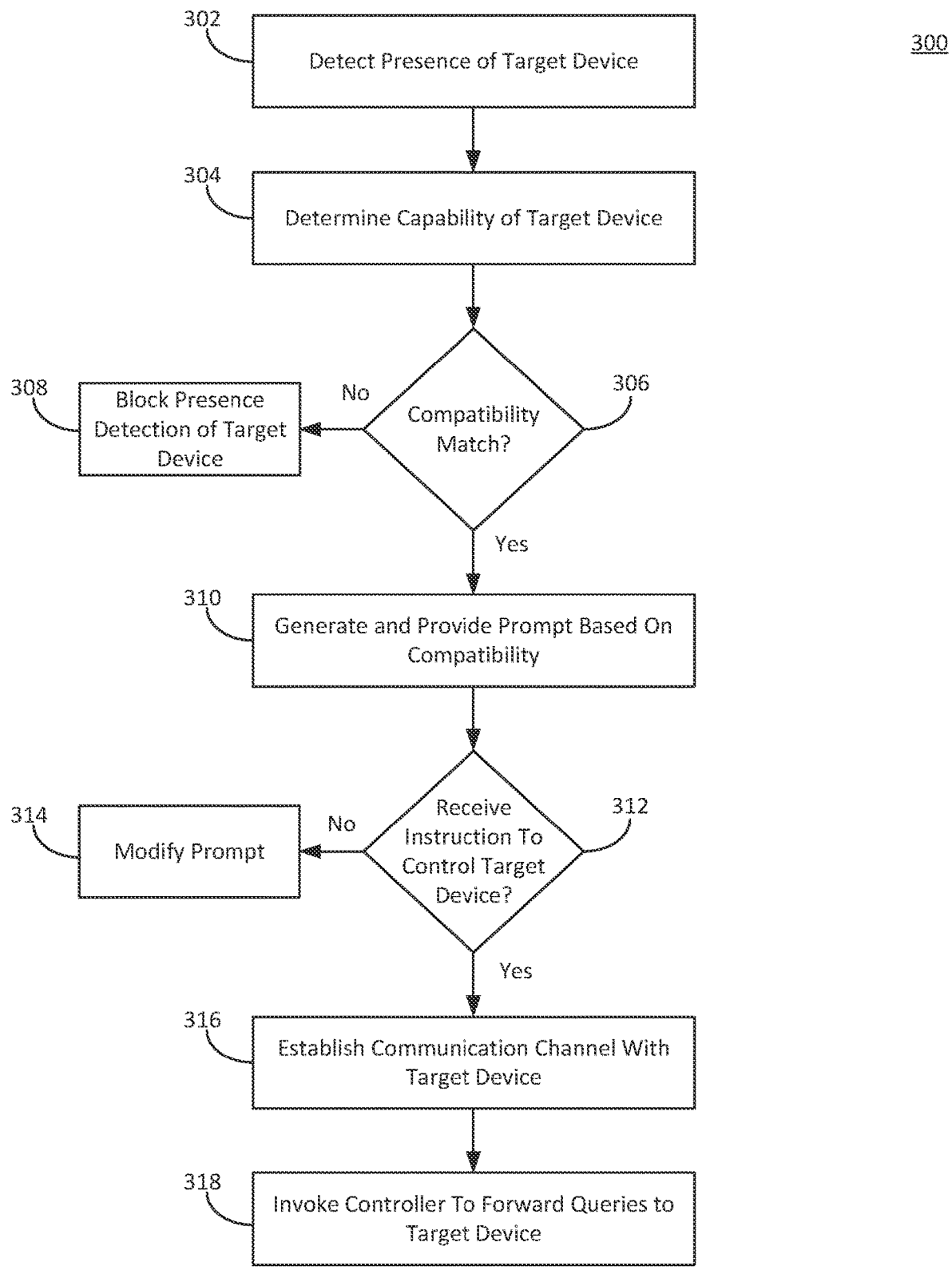
FIG. 3 is an illustration of an example method of virtual remote control among digital assistant devices, in accordance with implementations.

FIG. 3 is an illustration of an example method of dynamic remote control of devices, in accordance with implementations. The method 300 can be performed by one or more system or component depicted in FIG. 1, including, for example, a data processing system, source computing device, or target computing device. At 302, a source device can detect the presence of a target the device. The source device can include a mobile computing device, such as a smart phone or smart watch, or other computing device. The source device can detect the presence by detecting a signal transmitted or broadcasted by the target device. The target device can include, for example, a smart television or display, or speaker, or network connected device, such as an IoT device (e.g., a smart appliance, speaker or automobile).

At 304, the source device can determine a capability of the target device. The source device can determine the target device includes a controller to which queries can be forwarded by the source device. The source device can determine the target device is configured with a digital assistant. The source device can determine the functionality based on information present in the broadcasted signal, or using other techniques, such as performing a lookup or web search using a device identifier or type.

At 306, the source device can determine whether the target device is compatible with the source device. The source device can determine a compatibility match based on a condition or specification of the source device that allows the source device to forward queries to the target device for fulfillment. For example, if the target device includes a controller that is configured to receive queries from the virtual controller of the source device, then the source device can determine the target device is compatible with the source device. In some cases, the compatibility matching can refer to or be based on a version of a software application or program installed on the source device or target device. In some cases, the compatibility match can be based on a user preference. For example, the profile stored on the source device can include settings or preferences for types of target devices with which to establish a communication session. The user can indicate, in a profile, to only establish communication sessions with smart displays or smart televisions. Accordingly, if the target device is a smart display or smart television, then the source device can determine at 306 that there is a compatibility match. If there is no compatibility match (e.g., the type of device does not match a setting or the target device does not have a controller or digital assistant compatible with the source device), then the method can proceed to block 308 to block further presence detection of the target device.

If, however, the source devices determines the target device is compatible with the source device at 306, the source device can proceed to 310 to generate and provide a prompt. The source device can provide a prompt based on the compatibility or a capability of the target device. For example, if the target device includes a digital assistant or query processor that can process voice queries, then the prompt can include a microphone. The prompt can ask the user for authorization to establish a communication channel or communication session with the target device. The source device can present the prompt via display of the source device. In some cases, the prompt can include or be associated with an audio prompt, visual prompt, haptic prompt, or other type of prompt that gains the attention of the user.

At 312, the source device can receive an instruction to control the target device. The instruction can be received via a user input from the source device and responsive to the prompt. The instruction can be a touch input or voice input that indicates a desire to control the target device. Controlling the target device can include, for example, playing video or music on the target device, accessing information via the target device, playing photos on the target device, or otherwise using a function or capability of the target device. If the user does not input an instruction to control the device, or provides an indication to not control the target the device, the method can proceed to 314 to block establishing the communication channel. In some cases, the source device can modify the prompt. Modifying the prompt can refer to or include removing the prompt, hiding the prompt, or changing the prompt. For example, if the user indicates to not establish the communication channel, or does not provide any input for a predetermined amount of time after the prompt is generated (e.g., 1 minute, 2 minutes, 3 minutes, 4 minutes, etc.), then the source device can make the prompt smaller, or faded, or moved to a background on the display.

If, however, the user indicates to establish the communication channel with the target device responsive to the prompt, the method can proceed to 316 to establish the communication channel with the target device. Establishing the communication channel can include performing a handshaking process, sharing authentication credentials, or sharing a profile. The communication channel can be a gRPC session, or other type of protocol.

At 318, the source device can invoke a virtual controller. The source device can invoke or configure the virtual controller responsive to the communication session being established with the target device. The virtual controller can act as a proxy input interface for the target device. For example, the virtual controller can detect voice input or queries received by the source device, and then forward the queries to the target device. The target device, upon receiving the forwarded queries, can process the queries as if they were received directly at the target device from the user, thereby providing a seamless virtual control of the target device via the source device.

Figure 4:
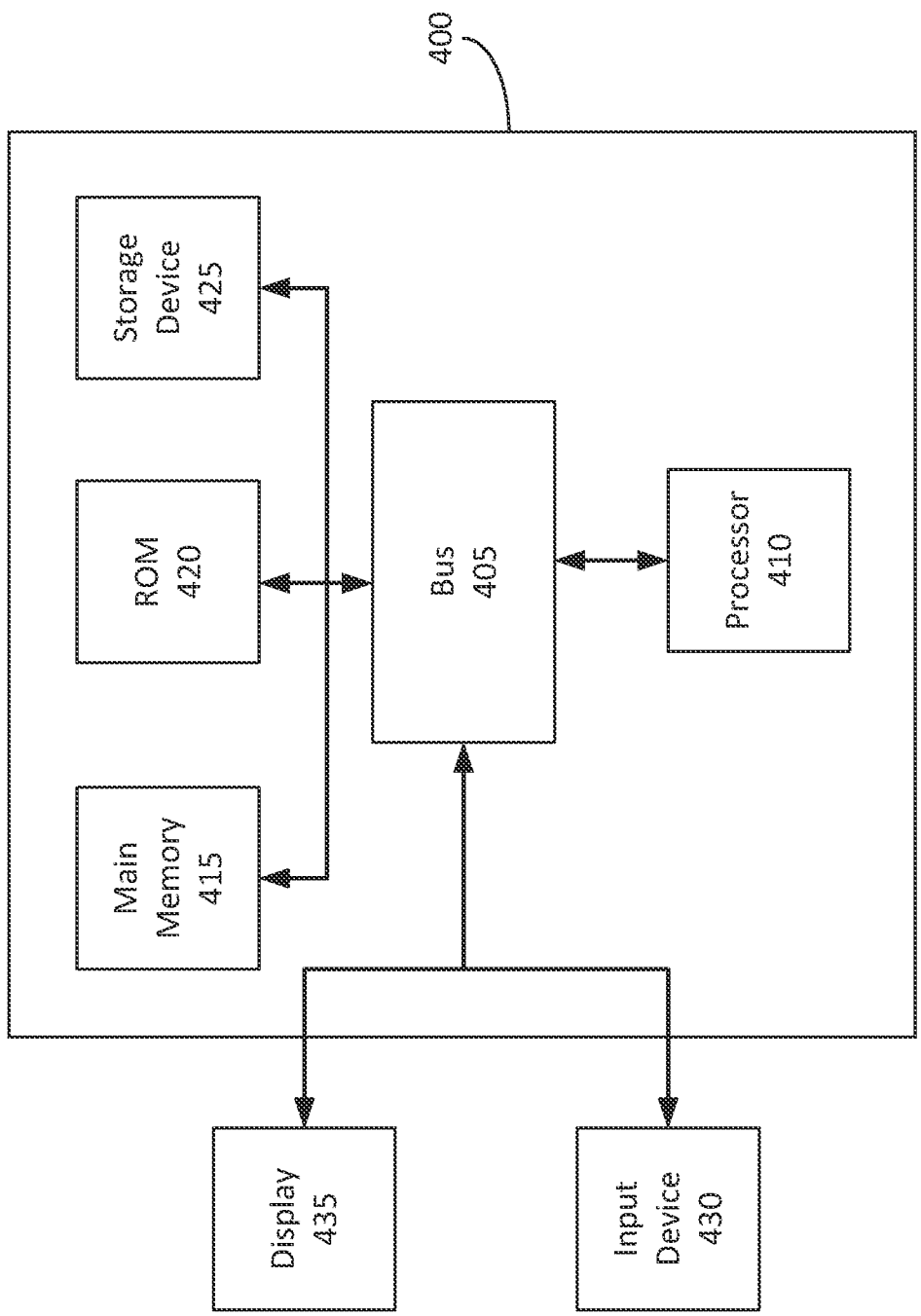
FIG. 4 is a block diagram illustrating an architecture for a computer system that can be employed to implement elements of the systems and methods described and illustrated herein, including, for example, the systems depicted in FIGS. 1 and 2, and the method depicted in FIG. 3.

FIG. 4 is a block diagram of an example computer system 400. The computer system or computing device 400 can include or be used to implement the system 100, or its components such as the data processing system 102, source computing device 112, or target computing device 132. The data processing system 102, source computing device 112, or target computing device 132 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the source computing device 112, target computing device 132, or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the presence API 116, pairing component 118, virtual controller 120, or other components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the source computing device 112 or the supplemental digital content provider device 144).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the natural language processor 106 and interface 104 can be a single component, app, or program, or a logic device having one or more processing circuits, or part of one or more servers of the data processing system 102.

Having now described some illustrative implementations, it is apparent that the foregoing is illustrative and not limiting, having been provided by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for remote control of devices, comprising:
a first computing device comprising one or more processors and memory to:
detect, using a presence application programming interface (API), a second computing device located within a wireless communication range of the first computing device based on a strength of one or more signals exchanged between the first computing device and the second computing device, the strength of the one or more signals being indicative of a distance between the first computing device and the second computing device by:
identifying, by the presence API, a signal broadcast by a signal broadcaster of the second computing device;
analyzing, by the presence API, the signal; and
based on analyzing the signal, determining at least one of a name of the second computing device, a type of device of the second computing device, or a capability of the second computing device;
determine, responsive to detecting the second computing device and based on the one or more signals exchanged between the first computing device and the second computing device, a capability of the second computing device to fulfill a request or query based on the second computing device comprising at least (i) a controller and (iii) a query processor;
generate, based on the capability of the second computing device to fulfill the request or query, a prompt indicating that the first computing device is capable to control the second computing device;
receive, responsive to the prompt, an instruction to control the second computing device based on input received by the first computing device;
automatically establish, responsive to the instruction, a communication channel with the second computing device;
invoke a virtual controller on the first computing device to forward queries received by the first computing device to the second computing device via the communication channel to control the second computing device;
receive input comprising a natural language query from a sensor of the first computing device, wherein the sensor comprises a microphone; and
transmit the natural language query to the controller of the second computing device, wherein the query is processed by at least one of the controller or the query processor of the second computing device to perform an action associated with the natural language query.

2. The system of claim 1, wherein the second computing device broadcasts information about the second computing device, comprising the first computing device to:
receive the information broadcasted by the second computing device; and
determine the capability of the second computing device based on the information.

3. The system of claim 1, comprising:
the first computing device to perform a handshaking process with the second computing device using one or more security credentials to establish the communication channel.

4. The system of claim 1, comprising:
the first computing device to maintain an icon on a display device of the first computing device indicating the virtual controller is active to forward queries via the communication channel.

5. The system of claim 1, comprising:
the second computing device to access, responsive to establishment of the communication channel, a profile associated with the first computing device.

6. The system of claim 1, comprising:
the first computing device to disconnect from the second computing device and terminate the communication channel, wherein the second computing device removes any profile information received from the first computing device subsequent to the establishment of the communication channel.

7. The system of claim 1, comprising:
the first computing device to establish the communication channel as two-way communication layer over a wireless protocol.

8. The system of claim 1, comprising:
the first computing device to establish the communication channel with the second computing device with a websocket protocol.

9. The system of claim 1, comprising:
the second computing device to receive a query forwarded from the first computing device, and process the query to control a function of the second computing device.

10. The system of claim 1, comprising:
the first computing device to detect, via a microphone of the first computing device, an audio input comprising a query, and forward the audio input to the second computing device via the communication channel; and
the second computing device to receive the audio input, parse the audio input to identify the query, and process the query to control a function of the second computing device.

11. The system of claim 1, comprising:
the second computing device to transmit, to a data processing system remote from the first computing device and the second computing device, a request for content; and
the data processing system to:
generate, responsive to the request for content, a second request for supplemental digital content different from the content of the request;
select, responsive to the second request for supplemental digital content, a supplemental content item responsive to the second request and based on profile information associated with the first computing device responsive to the communication channel between the first computing device and the second computing device being active; and
provide, for display on the second computing device, the supplemental content item different from the content of the request.

12. A method for remote control of devices, comprising:
detecting, by a first computing device comprising one or more processors and memory, using a present presence application programming interface (API), a second computing device located within a wireless communication range of the first computing device based on a strength of one or more signals exchanged between the first computing device and the second computing device, the strength of the one or more signals being indicative of a distance between the first computing device and the second computing device by:
identifying, by the presence API, a signal broadcast by a signal broadcaster of the second computing device;
analyzing, by the presence API, the signal; and
based on analyzing the signal, determining at least one of a name of the second computing device, a type of device of the second computing device, or a capability of the second computing device;
determining, by the first computing device responsive to detecting the second computing device and based on the one or more signals exchanged between the first computing device and the second computing device, a capability of the second computing device to fulfill a request or query based on the second computing device comprising at least (i) a controller and (iii) a query processor;
- generating, by the first computing device based on the capability of the second computing device to fulfill the request or query, a prompt indicating that the first computing device is capable to control the second computing device;
- receiving, by the first computing device responsive to the prompt, an instruction to control the second computing device based on input received by the first computing device;

automatically establishing, by the first computing device responsive to the instruction, a communication channel with the second computing device;
- invoking, by the first computing device, a virtual controller on the first computing device to forward natural language queries received by the first computing device to the second computing device via the communication channel to control the second computing device;
- receiving input comprising a natural language query from a sensor of the first computing device, wherein the natural language input comprises a natural language query obtained from a sensor of the first computing device comprising a microphone; and
- transmitting the natural language query to the controller of the second computing device, wherein the query is processed by at least one of the controller or the query processor of the second computing device to perform an action associated with the natural language query.

13. The method of claim 12, wherein the second computing device broadcasts information about the second computing device, comprising:
- receiving, by the first computing device, the information broadcasted by the second computing device; and
- determining, by the first computing device, the capability of the second computing device based on the information.

14. The method of claim 12, comprising:
- performing, by the first computing device, a handshaking process with the second computing device using one or more security credentials to establish the communication channel.

15. The method of claim 12, comprising:
- maintaining, by the first computing device, an icon on a display device of the first computing device indicating the virtual controller is active to forward queries via the communication channel.

16. The method of claim 12, comprising:
- accessing, by the second computing device responsive to establishment of the communication channel, a profile associated with the first computing device.

17. The method of claim 12, comprising:
- disconnecting, by the first computing device, from the second computing device and terminating the communication channel, wherein the second computing device removes any profile information received from the first computing device subsequent to the establishment of the communication channel.

18. The method of claim 12, comprising:
- establishing, by the first computing device, the communication channel as two-way communication layer over a wireless protocol.

19. The method of claim 12, comprising:
- receiving, by the second computing device, a query forwarded from the first computing device, and process the query to control a function of the second computing device.

* * * * *